(12) United States Patent
Li (10) Patent No.: US 10,124,451 B2
(45) Date of Patent: Nov. 13, 2018

(54) DRIVELINE COMPONENT HAVING RING GEAR INTEGRALLY FORMED WITH TUBULAR DRIVE MEMBER

(71) Applicant: American Axle & Manufacturing, Inc., Detroit, MI (US)

(72) Inventor: Yongwei Li, Shanghai (CN)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 324 days.

(21) Appl. No.: 14/880,334

(22) Filed: Oct. 12, 2015

(65) Prior Publication Data

US 2016/0109013 A1    Apr. 21, 2016

(30) Foreign Application Priority Data

Oct. 17, 2014    (CN) .......................... 2014 1 0553838

(51) Int. Cl.
*F16H 37/06*    (2006.01)
*B23P 15/14*    (2006.01)
(Continued)

(52) U.S. Cl.
CPC ............ *B23P 15/14* (2013.01); *B60K 17/344* (2013.01); *B60K 23/08* (2013.01); *B60K 17/02* (2013.01);
(Continued)

(58) Field of Classification Search
CPC ........ B60K 17/36; B60K 17/344; F16H 1/222
(Continued)

(56) References Cited

U.S. PATENT DOCUMENTS 4,915,190 A * 4/1990 Iwata .................... B60K 23/08
                                                      180/247
7,150,694 B2 * 12/2006 Mizon .................... B60K 17/35
                                                      475/206
(Continued)

FOREIGN PATENT DOCUMENTS

CN           101688565 A       3/2010

OTHER PUBLICATIONS

First Office Action issued by Chinese International Patent Office in Application No. 201410553838.3.

*Primary Examiner* — Ha Dinh Ho
(74) *Attorney, Agent, or Firm* — Harness, Dickey & Pierce, P.L.C.

(57) ABSTRACT

The present teachings provide for a power transfer device and method of forming a power transfer device that includes a unitarily formed transfer member and a support member. The transfer member can be supported within a housing for rotation about an input member and can be coupled to the input member to receive rotational power therefrom. A ring gear defined by the transfer member can meshingly engage with a pinion gear. The support member can be disposed concentrically about the input member and be rotatable about a first axis relative to the housing. The support member can have a first end and a second end. The first end of the support member can be supported for rotation relative to the housing by a support bearing. The second end of the support member can be received within a bore defined by the transfer member and fixedly coupled thereto for common rotation.

20 Claims, 2 Drawing Sheets

(51) Int. Cl.
  *B60K 17/344* (2006.01)
  *B60K 23/08* (2006.01)
  *B60K 17/02* (2006.01)

(52) U.S. Cl.
  CPC ............... *B60K 2023/0833* (2013.01); *B60K 2023/0858* (2013.01)

(58) Field of Classification Search
  USPC ............... 74/665 F, 665 GB, 665 GC, 665 H
  See application file for complete search history.

(56) References Cited

U.S. PATENT DOCUMENTS

| | | | |
|---|---|---|---|
| 7,207,409 B2 | 4/2007 | Downs | |
| 7,416,505 B2 | 8/2008 | Downs | |
| 7,445,575 B2 | 11/2008 | Capito | |
| 8,042,642 B2 | 10/2011 | Marsh et al. | |
| 8,047,323 B2 | 11/2011 | Downs et al. | |
| 8,469,854 B1 | 6/2013 | Downs et al. | |
| 8,584,785 B2 | 11/2013 | Marsh et al. | |
| 8,584,786 B2 * | 11/2013 | Grogg | B60K 17/35 180/248 |
| 8,597,150 B1 | 12/2013 | Downs et al. | |
| 8,784,254 B2 * | 7/2014 | Zink | F16H 57/037 464/7 |
| 8,795,126 B2 * | 8/2014 | Downs | F16H 48/22 475/201 |
| 8,986,148 B2 * | 3/2015 | Downs | B60K 17/35 475/204 |
| 2009/0229905 A1 | 9/2009 | Kato et al. | |

* cited by examiner

DRIVELINE COMPONENT HAVING RING GEAR INTEGRALLY FORMED WITH TUBULAR DRIVE MEMBER

CROSS-REFERENCE TO RELATED APPLICATIONS

This application claims the benefit and priority of Chinese Patent Application Number 201410553838.3, filed Oct. 17, 2014. The entire disclosure of the above application is incorporated herein by reference.

FIELD

The present disclosure relates to a driveline component having a ring gear integrally formed with a tubular drive member.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction. Such AWD vehicles are typically equipped with a much more complex drivetrain (relative to a FWD architecture) which, in addition to the primary driveline, must include the additional components associated with the secondary driveline such as a power take-off unit ("PTU") and a propshaft.

In a traditional PTU, rotational power is transmitted from the powertrain to a gear shaft, and from the gear shaft to a ring gear. The ring gear transmits power to a pinion gear which in turn transmits power to the propshaft. Traditionally, the ring gear is fitted about the gear shaft then welded in place to the gear shaft. This welding is typically done via laser welding, which can be costly and time consuming. To this end, there remains a need in the art for development of improved driveline components for use in the drivelines of AWD vehicles.

SUMMARY

This section provides a general summary of the disclosure, and is not a comprehensive disclosure of its full scope or all of its features.

The present teachings provide for a power transfer device including housing, an input member, a pinion, a unitarily formed transfer member, a support bearing, and a support member. The input member can be disposed within the housing and supported for rotation about a first axis. The pinion can be disposed within the housing and supported for rotation about a second axis that is transverse to the first axis. The transfer member can be supported within the housing for rotation about the input member and can be coupled to the input member to receive rotational power therefrom. The transfer member can define a bore and a ring gear. The ring gear can be meshingly engaged with the pinion gear. The support member can be disposed concentrically about the input member and can be rotatable about the first axis relative to the housing. The support member can have a first end and a second end. The first end of the support member can be supported for rotation relative to the housing by the support bearing. The second end of the support member can be received within the bore and fixedly coupled to the transfer member for common rotation.

The present teachings further provide for a power transfer device including a housing, an input member, a pinion, a support bearing, a power member, and a second tube. The input member can have a generally tubular shape. The input member can be disposed within the housing and supported for rotation relative to the housing about a first axis. The pinion can be supported within the housing for rotation about a second axis that is transverse to the first axis. The power member can be a single-piece body that can define a ring gear and a first tube. The ring gear can be meshingly engaged with the pinion and can define a bore that is concentric with the input member. The first tube can extend in a first axial direction from the ring gear. The first tube can be coupled to the input member for transmission of rotary power therebetween. The second tube can have a first end and a second end. The first end of the second tube can be supported for rotation relative to the housing by the support bearing. The second end can be received within the bore and fixedly coupled to the power member for common rotation.

The present teachings further provide for a method of forming a power transfer device. The method can include providing a PTU housing, a support tube, an input member, and a pinion. The method can include forging a first body to have an annular portion and a tubular portion extending concentrically from the annular portion. The method can include forming a first set of gear teeth into the annular portion. The method can include supporting a first end of the support tube within the PTU housing for rotation relative to the PTU housing about a first axis. The method can include fixedly coupling a second end of the support tube to the first body. The method can include positioning the input member concentrically within a bore of the support tube and a bore of the first body. The method can include coupling the input member to the first body for common rotation about the first axis. The method can include supporting the pinion within the PTU housing for meshing engagement with the first set of gear teeth and for rotation relative to the PTU housing about a second axis that is transverse to the first axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
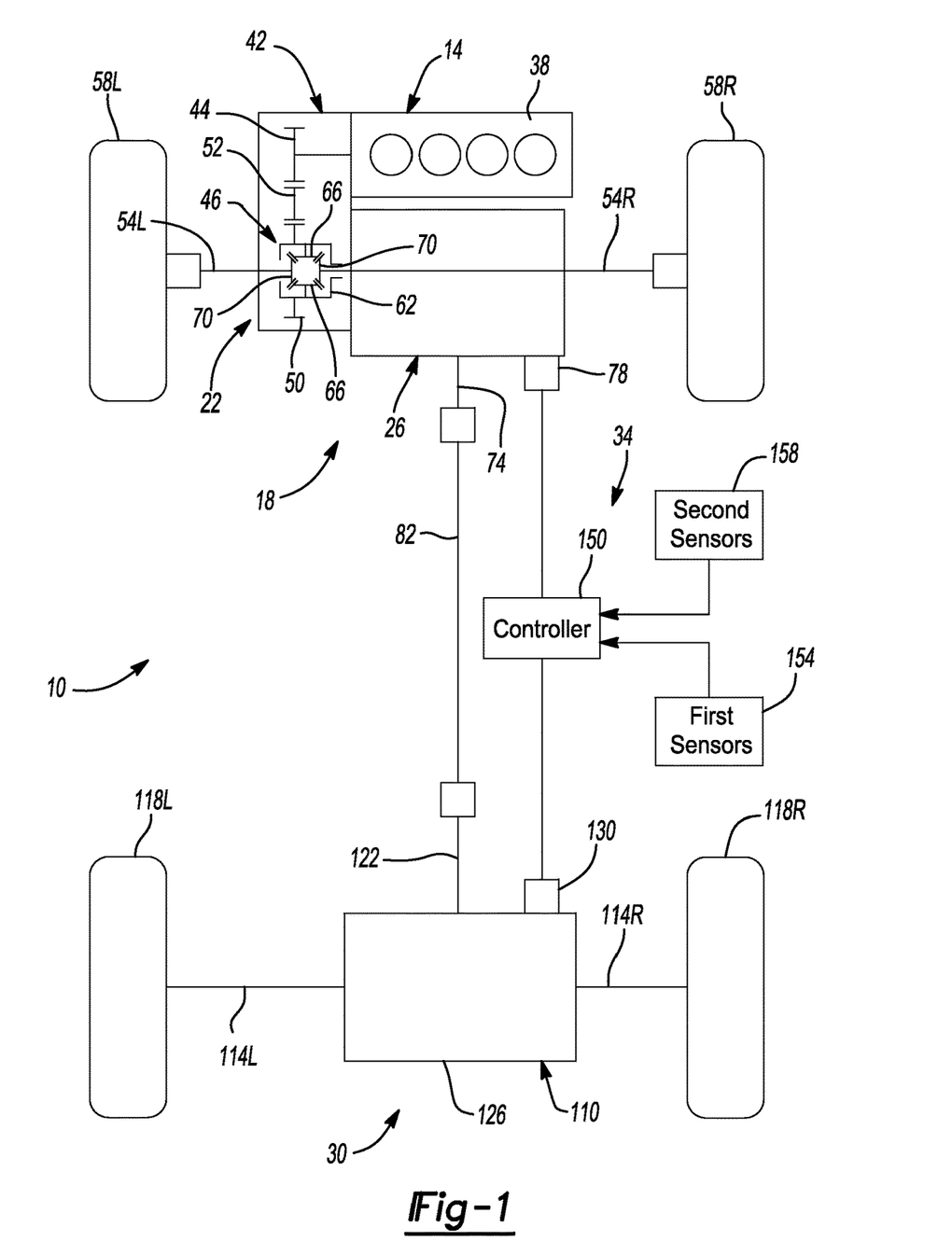
FIG. 1 is a schematic illustration of a vehicle having a disconnecting AWD driveline having a power take-off unit constructed in accordance with the teachings of the present disclosure.

With reference to FIG. 1 of the drawings, a motor vehicle constructed in accordance with the teachings of the present disclosure is schematically shown and generally indicated by reference numeral 10. The vehicle 10 can include a powertrain 14 and a drivetrain 18 that can include a primary driveline 22, a power switching mechanism 26, a secondary driveline 30, and a control system 34. In the various aspects of the present teachings, the primary driveline 22 can be a front driveline while the secondary driveline 30 can be a rear driveline.

The powertrain 14 can include a prime mover 38, such as an internal combustion engine or an electric motor, and a transmission 42. The transmission 42 can have a transmission gearset 44 which can be any type of ratio-changing mechanism, such as a manual, automatic, or continuously variable transmission. The prime mover 38 is operable to provide rotary power to the primary driveline 22 and the power switching mechanism 26.

The primary driveline 22 can include a primary or first differential 46 having an input member 50 driven by an output member 52 of the transmission 42. In the particular example shown, the first differential 46 is configured as part of the transmission 42, a type commonly referred to as a transaxle and typically used in front-wheel drive vehicles. The primary driveline 22 can further include a pair of first axleshafts 54L, 54R that can couple output components of the first differential 46 to a set of first vehicle wheels 58L, 58R. The first differential 46 can include a first differential case 62 that is rotatably driven by the input member 50, at least one pair of first pinion gears 66 rotatably driven by the first differential case 62, and a pair of first side gears 70. Each of the first side gears 70 can be meshed with the first pinion gears 66 and drivingly coupled to an associated one of the first axleshafts 54L, 54R.

The power switching mechanism 26, hereinafter referred to as a power take-off unit ("PTU"), can transmit rotary power from the transmission 42 to an output pinion shaft 74. The PTU 26 can include a PTU actuator 78 configured to permit the PTU 26 to selectively control rotary power transmission between the transmission 42 and the output pinion shaft 74. The PTU 26 is described in greater detail below with reference to FIG. 2. The output pinion shaft 74 can be coupled to a propshaft 82 to transmit rotary power to between the primary driveline 22 and the secondary driveline 30.

The secondary driveline 30 can include the propshaft 82, a rear drive module ("RDM") 110, a pair of second axleshafts 114L, 114R, and a set of second vehicle wheels 118L, 118R. A first end of the propshaft 82 can be coupled for rotation with the output pinion shaft 74 extending from the power take-off unit 26 while a second end of the propshaft 82 can be coupled for rotation with an input 122 of the rear drive module 110, such as a pinion shaft for example. The rear drive module 110 can be configured to transfer rotational input from input 122 to the drive axleshafts 114L, 114R. The rear drive module 110 can include, for example a housing 126, a secondary or second differential (not shown), a torque transfer device ("TTD") (not shown) that is generally configured and arranged to selectively couple and transmit rotary power from the input 122 to the second differential, and a TTD actuator 130. The second differential can be configured to drive the axleshafts 114L, 114R. The TTD can include any type of clutch or coupling device that can be employed to selectively transmit rotary power from the input 122 to the second differential, such as a multi-plate friction clutch for example. The TTD actuator 130 is provided to selectively engage and disengage the TTD, and can be controlled by control signals from the control system 34. The TTD actuator 130 can be any power-operated device capable of shifting the TTD between its first and second modes as well as adaptively regulating the magnitude of the clutch engagement force exerted.

The control system 34 is schematically shown in FIG. 1 to include a controller 150, a group of first sensors 154, and a group of second sensors 158. The group of first sensors 154 can be arranged within the motor vehicle 10 to sense a vehicle parameter and responsively generate a first sensor signal. The vehicle parameter can be associated with any combination of the following: vehicle speed, yaw rate, steering angle, engine torque, wheel speeds, shaft speeds, lateral acceleration, longitudinal acceleration, throttle position, position of a component of the PTU actuator 78, position of a component of the TTD actuator 130, and position of a component or gear of the PTU 26 or transmission 42, without limitations thereto. The controller 150 can include an actuator displacement feedback loop that permits the controller 150 to accurately determine the position of an element associated with the PTU actuator 78. The group of second sensors 158 can be configured to sense a driver-initiated input to one or more on-board devices and/or systems within the vehicle 10 and responsively generate a second sensor signal. For example, the motor vehicle 10 may be equipped with a sensor associated with a mode selection device, such as a switch associated with a push button or a lever, that senses when the vehicle operator has selected between vehicle operation in a two-wheel drive (FWD) mode and an all-wheel drive (AWD) mode. Also, switched actuation of vehicular systems such as the windshield wipers, the defroster, and/or the heating system, for example, may be used by the controller 150 to assess whether the motor vehicle 10 should be shifted automatically between the FWD and AWD modes.

Figure 2:
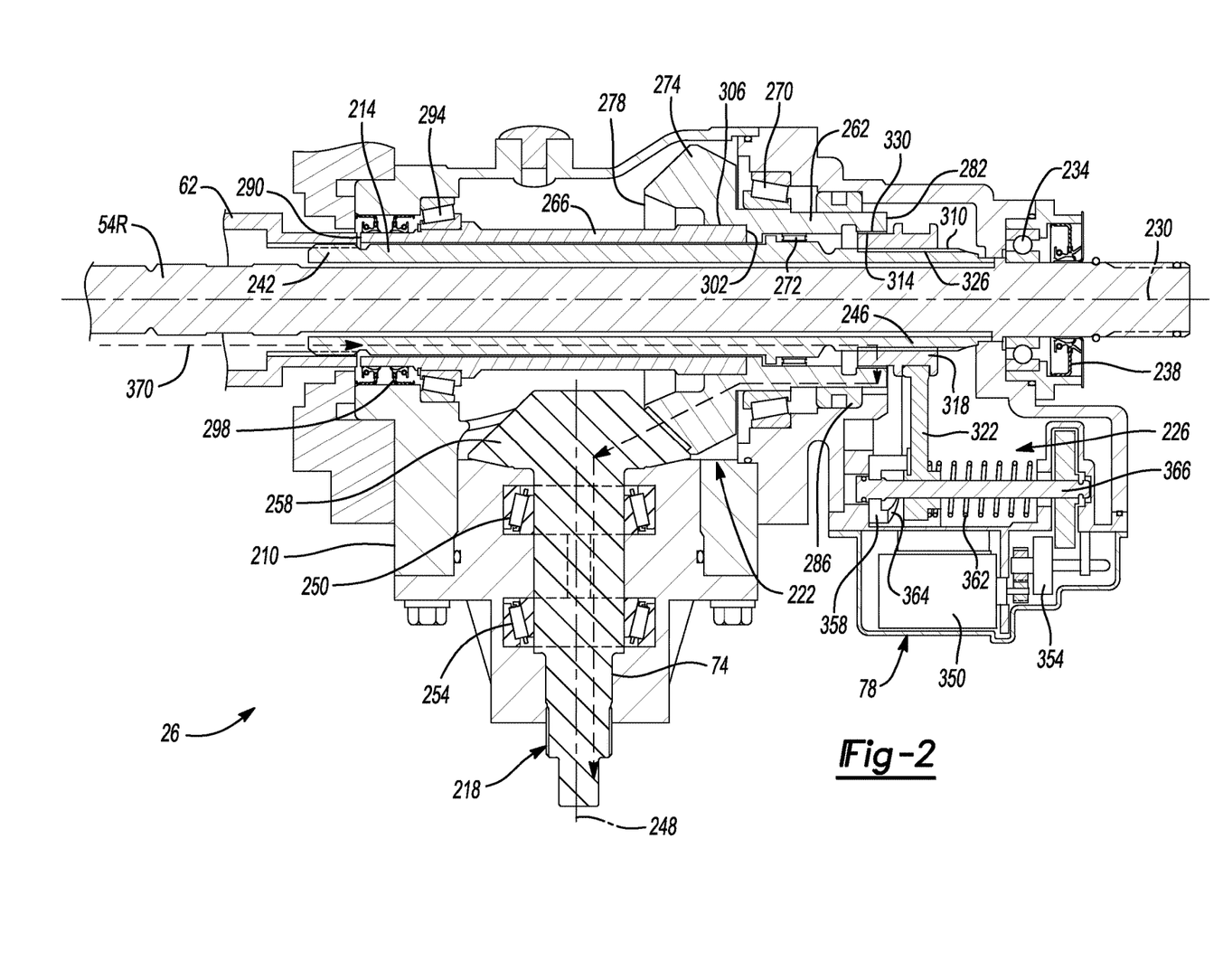
FIG. 2 is a sectional view of the power take-off unit that is schematically shown in FIG. 1 taken through a rotational axis of an input shaft of the power take-off unit.

With additional reference to FIG. 2, PTU 26 can generally include a housing 210, an input shaft 214 coupled for common rotation with the first differential case 62 of the first differential 46, an output 218, a transfer gear assembly 222, a disconnect mechanism 226, and the PTU actuator 78. The input shaft 214 can be a tubular shaft disposed within the housing 210 and supported for rotation about a first axis 230, and which concentrically surrounds a portion of the first axleshaft 54R. The first axleshaft 54R can be supported for rotation within the housing 210 by a first bearing 234 and a first seal 238 can be disposed between the housing 210 and the first axle shaft 54R, axially between the first bearing 234 and the end of the axle shaft 54R that is coupled to the wheel 58R. The input shaft 214 can be a unitarily formed structure having a first end 242 coupled for rotation with the first differential case 62 and a second end 246 configured to transmit torque to the transfer gear assembly 222 as described below.

The output 218 can include the output pinion shaft 74, rotatably supported about a second axis 248 by the housing 210 via a head bearing 250 and a tail bearing 254, and including a pinion gear 258. The second axis 248 can be perpendicular to the first axis 230. The transfer gear assembly 222 can include a hollow transfer member 262, and a tubular support shaft 266. The transfer member 262 concentrically surrounds a portion of the input shaft 214 proximate to the second end 246 of the input shaft 214, and is rotatably supported by the housing 210 via a second bearing 270. A third bearing or bushing 272 can be disposed between the transfer member 262 and the input shaft 214. A ring gear 274, that is meshed with the pinion gear 258, is formed at a first end 278 of the transfer member 262. In the example provided the ring gear 274 is a hypoid gear. The transfer member 262 is formed of a single piece of material, and in the example provided is a unitarily forged structure. In the example provided, the second and third bearings 270, 272 are disposed axially between the ring gear 274 and a second end 282 of the transfer member 262. In the example provided, a second seal 286 is disposed radially between the transfer member 262 and the housing 210, axially between the second bearing 270 and the second end 282 of the transfer member 262.

The support shaft 266 concentrically surrounds a portion of the input shaft 214 and a first end 290 of the support shaft 266 is rotatably supported by the housing 210 via a fourth bearing 294 proximate to the first end 242 of the input shaft 214. A third seal 298 can be disposed between the housing 210 and the support shaft 266, axially between the fourth bearing 294 and the first end 290 of the support shaft 266. A second end 302 of the support shaft 266 is received in a bore 306 defined by the first end 278 of the transfer member 262. The bore 306 is concentric with the ring gear 274 and in the example provided, extends from the first end 278 of the transfer member 262 axially toward the second end 282 and terminates axially between the ring gear 274 and the second end 282 of the transfer member 262. The second end 302 of the support shaft 266 has a diameter greater than the diameter of the bore 306, such that the second end 302 has an interference fit with the bore 306 and is pressed into the bore 306 to couple the support shaft 266 to the transfer member 262.

The disconnect mechanism 226 can comprise any type of clutch, disconnect or coupling device that can be employed to selectively transmit rotary power from the primary driveline 22 to the secondary driveline 30. In the particular example provided, the disconnect mechanism 226 comprises a clutch having a set of external spline teeth 310, which can be formed on the second end 246 of the input shaft 214, a set of internal spline teeth 314, which can be formed on the second end 282 of the transfer member 262, a mode collar 318, and a shift fork 322 operable to axially translate the mode collar 318 between a first mode position and a second mode position. It will be appreciated that the clutch could include a synchronizer if such a configuration is desired. The mode collar 318 can have internal spline teeth 326, which are constantly meshed with the external spline teeth 310 on the input shaft 214, and external spline teeth 330, which are configured to meshingly engage with the internal spline teeth 314 on the transfer member 262.

The mode collar 318 is shown in FIG. 2 in its first mode position, wherein the external spline teeth 330 on the mode collar 318 are engaged with the internal spline teeth 314 on the transfer member 262. As such, the input shaft 214 is connected for driving engagement with the transfer member 262. Thus, rotary power is transmitted from the powertrain 14 to the transfer gear assembly 222 and the output pinion shaft 74 of the power take-off unit 26. With the mode collar 318 in its second mode position (not shown), the external spline teeth 330 of the mode collar 318 are disengaged from the internal spline teeth 314 on the transfer member 262. Accordingly, the drive connection between the input shaft 214 and the transfer member 262 is not established, such that rotary power from the powertrain 14 is not transmitted through the PTU 26 to the output pinion shaft 74.

The PTU actuator 78 can include a motor 350, a plurality of gears 354, an actuator member 358, and a biasing member 362. The motor 350 can be configured to provide rotary power to the gears 354, which can be configured to rotate the actuator member 358. The actuator member 358 can be operable for axially, or linearly moving the shift fork 322 which is coupled to the mode collar 318 to cause concurrent axial translation of the mode collar 318 between the first and second mode positions. In the example provided, the actuator member 358 includes a cam surface 364 and a shaft 366. The shaft 366 can be coupled to the gears 354 such that the actuator member 358 is rotatably driven by the motor 350. The cam surface 364 and is configured to act on the shift fork 322 to linearly move the shift fork 322 between the first and second positions when the actuator member 358 rotates. It is understood that other constructions of the actuator member 358 can be used, such as a lead screw for example. The biasing member 362 can be configured to bias the shift fork 322 into contact with the cam surface 364. In the example provided, the biasing member 362 is a coil spring disposed about the shaft 366 and is configured to bias the shift fork 322 toward the cam surface 364. The PTU actuator 78 is shown mounted to the housing 210 of the PTU 26. The PTU actuator 78 can be a power-operated mechanism that can receive control signals from the control system 34.

The vehicle 10 can normally be operated in the two-wheel drive (FWD) mode in which the PTU 26 and the rear drive module 110 are both disengaged. Specifically, the mode collar 318 of the disconnect mechanism 226 is positioned by the PTU actuator 78 in its second (2WD) mode position such that the input shaft 214 is uncoupled from the transfer member 262. As such, substantially all power provided by the powertrain 14 is transmitted to the primary driveline 22. Likewise, the TTD can be disconnected such that the input 122, the propshaft 82, the output pinion shaft 74 and the transfer gear assembly 222 within the PTU 26 are not back-driven due to rolling movement of the second vehicle wheels 118L, 118R.

When it is desired or necessary to operate the motor vehicle 10 in the all-wheel drive (AWD) mode, the control system 34 can be activated via a suitable input which, as noted, can include a driver requested input (via the mode select device) and/or an input generated by the controller 150 in response to signals from the first sensors 154 and/or the second sensors 158. The controller 150 initially signals the TTD actuator 130 to engage the TTD to couple the input 122 to the axleshafts 114L, 114R. Specifically, the controller 150 controls operation of the TTD actuator 130 such that the TTD is coupled sufficiently to synchronize the speed of the secondary driveline 30 with the speed of the primary driveline 22. Upon speed synchronization, the controller 150 signals the PTU actuator 78 to cause the mode collar 318 in the PTU 26 to move from its second mode position into its first mode position. With the mode collar 318 in its first mode position, rotary power is transmitted from the powertrain 14 to the primary driveline 22 and the secondary driveline 30. It will be appreciated that subsequent control of the magnitude of the clutch engagement force generated by the TTD permits torque biasing for controlling the torque distribution ratio transmitted from the powertrain 14 to the primary driveline 22 and the secondary driveline 30.

With the mode collar 318 in the first mode position, torque is transmitted through the PTU 26 in a pathway denoted by arrows 370. In this mode, the rotary power is received from the transmission 42, and transmitted to the input shaft 214. Power is transmitted from the input shaft 214 to the mode collar 318, and from the mode collar 318 to the transfer member 262. Power is transmitted from the ring gear 274 of the transfer member 262 to the pinion gear 258 of the output 218. In this mode, torque is not transmitted through the support shaft 266 on its way to the output 218, and thus the support shaft 266 does not receive high torque loads. Since the transfer member 262 is formed of a single forging including the ring gear 274, and the support shaft 266 is substantially unloaded, the support shaft 266 can be secured within the bore 306 via the interference fit and complicated and costly welding processes are avoided.

For example, in a traditional power take-off unit (not shown), a transfer shaft is constructed of a tubular member, such as a tubular forging, that is then machined to the appropriate dimensions. The ring gear is formed as a separate, annular piece, such as a separate forging that must subsequently undergo blanking and then gear cutting. The ring gear and transfer shaft are then cleaned and the ring gear is pressed onto the transfer shaft. The traditional power take-off unit is configured such that an input shaft is drivingly coupled to provide rotational power to the transfer shaft, which in turn transfers power to the ring gear. Accordingly, the traditional power take-off unit requires the ring gear to then be welded (typically laser welded) to the transfer shaft to ensure torque loads are transferred from the transfer shaft to the ring gear.

According to the present teachings, the transfer member 262 can be constructed of a single forging. The forging can have an annular portion (e.g. at 274), and a tubular portion (e.g. at 262) that extends concentrically from the annular portion. The forging can then undergo blanking and gear cutting operations to form the ring gear 274 into the transfer member 262. The separate tubular support shaft 266 can also be forged and machined, but can be formed of a different material and/or construction, which can be lighter or less robust than the traditional tubular transfer shaft, since the support shaft 266 is not torque loaded during operation. The transfer member 262 and the support shaft 266 can then be cleaned, and a sealant can be applied to the second end 302 of the support shaft 266 and/or the bore 306 of the transfer member 262. The second end 302 of the support shaft 266 is then pressed into the bore 306, such as by a machine press for example, to complete the assembly without the need to weld the ring gear 274.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power transfer device comprising:
a housing;
an input member disposed within the housing and supported for rotation about a first axis;
a pinion disposed within the housing and supported for rotation about a second axis that is transverse to the first axis;
a unitarily formed transfer member received in the housing and disposed about the input member, the transfer member being coupled to the input member to receive rotational power therefrom, the transfer member defining a bore and a ring gear, the ring gear being meshingly engaged with the pinion gear;

a first support bearing mounted to the housing;
a support member that is disposed concentrically about the input member, the support member having a first end and a second end, the first end of the support member being supported for rotation about the first axis relative to the housing by the first support bearing, the second end of the support member being received in the bore and fixedly coupled to the transfer member for common rotation and wherein the support member does not extend fully through the transfer member; and
a clutch having a clutch element that is movable along the first axis between a first position, in which the clutch couples the input member and the transfer member for common rotation, and a second position in which the input member and transfer member are rotationally decoupled from one another;
wherein the clutch element defines a first set of teeth and a second set of teeth, wherein the input member defines a third set of teeth and the transfer member defines a fourth set of teeth;
wherein when the clutch element is in the first position, the first set of teeth is meshingly engaged with the third set of teeth, and the second set of teeth is meshingly engaged with the fourth set of teeth; and
wherein when the clutch element is in the second position, one of the first and second sets of teeth is not engaged with a respective one of the third and fourth sets of teeth.

2. The power transfer device of claim 1, wherein the second end of the support member and the bore of the transfer member are coupled for common rotation by an interference fit.

3. The power transfer device of claim 1, wherein the bore is defined on a first end of the transfer member and the input member extends axially from the first end of the transfer member to a second end of the transfer member, the input member and transfer member being coupled at the second end of the transfer member.

4. The power transfer device of claim 1, wherein the ring gear and bore are defined by a first end of the transfer member and the fourth set of teeth is defined by a second end of the transfer member, opposite the first end of the transfer member; and
wherein a first end of the input member is adapted to be coupled to an output of a transmission to receive rotary power therefrom, and a second end of the input member extends axially through the transfer member from the first end of the transfer member to the second end of the transfer member, the second end of the input member defining the third set of teeth.

5. The power transfer device of claim 1, wherein the ring gear and pinion gear form a hypoid gear set.

6. The power transfer device of claim 1, wherein the transfer member is formed from a single forging.

7. The power transfer device of claim 1, further comprising a differential including a differential case that is drivingly coupled to the input member.

8. The power transfer device of claim 7, further comprising a drive module having a module input that is coupled to the pinion to receive rotary power therefrom, the drive module being configured to drive a pair of wheels.

9. The power transfer device of claim 1, wherein one of the first and third sets of teeth comprise external spline teeth and the other one of the first and third sets of teeth comprise internal spline teeth.

10. The power transfer device of claim 1, wherein one of the second and fourth sets of teeth comprise internal spline teeth and the other one of the second and fourth sets of teeth comprise external spline teeth.

11. The power transfer device of claim 1, further comprising a second support bearing mounted to the housing and the transfer member, the second support bearing being disposed along the first axis such that the ring gear is disposed between the first and second support bearings.

12. A power transfer device comprising:
a housing;
an input member having a generally tubular shape, the input member being disposed within the housing and supported for rotation relative to the housing about a first axis;
a pinion supported within the housing for rotation about a second axis that is transverse to the first axis;
a first support bearing mounted to the housing;
an integrally and unitarily formed power member that defines a gear, a bore and a first tube, the gear driving the pinion, the bore being formed in a first side of the gear concentric with the input member, the first tube extending along the first axis from a second side of the gear that is opposite the first side;
a second tube having a first end and a second end, wherein the first support bearing is mounted to the first end of the second tube to support the second tube for rotation relative to the housing about the first axis, and wherein the second end is received within the bore and fixedly coupled to the power member for common rotation;
a second support bearing mounted to the housing and the first tube to support the power member for rotation about the first axis, wherein the gear is disposed along the first axis between the first and second support bearings; and
a clutch having a clutch element that is movable along the first axis between a first position, in which the clutch couples the input member and the transfer member for common rotation, and a second position in which the input member and transfer member are rotationally decoupled from one another;
wherein the clutch element defines a first set of teeth and a second set of teeth, wherein the input member defines a third set of teeth and the transfer member defines a fourth set of teeth;
wherein when the clutch element is in the first position, the first set of teeth is meshingly engaged with the third set of teeth, and the second set of teeth is meshingly engaged with the fourth set of teeth; and
wherein when the clutch element is in the second position, one of the first and second sets of teeth is not engaged with a respective one of the third and fourth sets of teeth.

13. The power transfer device of claim 12, further comprising a differential including a differential case that is drivingly coupled to the input member.

14. The power transfer device of claim 13, further comprising a drive module having a module input that is coupled to the pinion to receive rotary power therefrom, the drive module being configured to drive a pair of wheels.

15. The power transfer device of claim 12, wherein one of the first and third sets of teeth comprise external spline teeth and the other one of the first and third sets of teeth comprise internal spline teeth.

16. The power transfer device of claim 12, wherein one of the second and fourth sets of teeth comprise internal spline teeth and the other one of the second and fourth sets of teeth comprise external spline teeth.

17. The power transfer device of claim 12, wherein the gear and the pinon are meshingly engaged to one another.

18. The power transfer device of claim 17, wherein the gear and pinion gear form a hypoid gear set.

19. A power transfer device comprising:
a housing;
an input member disposed within the housing and supported for rotation about a first axis;
a pinion disposed within the housing and supported for rotation about a second axis that is transverse to the first axis;
a unitarily formed transfer member received in the housing and disposed about the input member, the transfer member being coupled to the input member to receive rotational power therefrom, the transfer member defining a bore and a ring gear, the ring gear being meshingly engaged with the pinion gear;
a first support bearing mounted to the housing;
a support member that is disposed concentrically about the input member, the support member having a first end and a second end, the first end of the support member being supported for rotation about the first axis relative to the housing by the first support bearing, the second end of the support member being received in the bore and fixedly coupled to the transfer member for common rotation and wherein the support member does not extend fully through the transfer member;
a clutch having a clutch element that is movable along the first axis between a first position, in which the clutch couples the input member and the transfer member for common rotation, and a second position in which the input member and transfer member are rotationally decoupled from one another; and
an actuator having an actuator output member, which is engaged to the clutch element, and a motor that is configured to drive the actuator output member;
wherein the actuator output member comprises a fork that is received into a groove formed into the clutch element.

20. A power transfer device comprising:
a housing;
an input member having a generally tubular shape, the input member being disposed within the housing and supported for rotation relative to the housing about a first axis;
a pinion supported within the housing for rotation about a second axis that is transverse to the first axis;
a first support bearing mounted to the housing;
an integrally and unitarily formed power member that defines a gear, a bore and a first tube, the gear driving the pinion, the bore being formed in a first side of the gear concentric with the input member, the first tube extending along the first axis from a second side of the gear that is opposite the first side;
a second tube having a first end and a second end, wherein the first support bearing is mounted to the first end of the second tube to support the second tube for rotation relative to the housing about the first axis, and wherein the second end is received within the bore and fixedly coupled to the power member for common rotation;
a second support bearing mounted to the housing and the first tube to support the power member for rotation about the first axis, wherein the gear is disposed along the first axis between the first and second support bearings; and
a clutch having a clutch element that is movable along the first axis between a first position, in which the clutch couples the input member and the transfer member for common rotation, and a second position in which the input member and transfer member are rotationally decoupled from one another;
an actuator having an actuator output member, which is engaged to the clutch element, and a motor that is configured to drive the actuator output member;
wherein the actuator output member comprises a fork that is received into a groove formed into the clutch element.

* * * * *

UNITED STATES PATENT AND TRADEMARK OFFICE
CERTIFICATE OF CORRECTION

PATENT NO. : 10,124,451 B2
APPLICATION NO. : 14/880334
DATED : November 13, 2018
INVENTOR(S) : Yongwei Li Page 1 of 1

It is certified that error appears in the above-identified patent and that said Letters Patent is hereby corrected as shown below:

In the Claims

In Column 9, In Line 56 of Claim 7, after "that" delete "is" therefor.

In Column 11, In Line 2 of Claim 17, delete "pinon" and insert --pinion-- therefor.

Signed and Sealed this
Twenty-fifth Day of December, 2018

Andrei Iancu
*Director of the United States Patent and Trademark Office*